United States Patent
Schmidt et al.

(10) Patent No.: US 8,112,077 B2
(45) Date of Patent: Feb. 7, 2012

(54) METHOD AND APPARATUS FOR TRANSMITTING MEDIA DATA

(75) Inventors: Andreas Schmidt, Braunschweig (DE); Holger Schmidt, Braunschweig (DE); Norbert Schwagmann, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 229 days.

(21) Appl. No.: 11/549,328

(22) Filed: Oct. 13, 2006

(65) Prior Publication Data

US 2007/0087768 A1 Apr. 19, 2007

(30) Foreign Application Priority Data

Oct. 13, 2005 (DE) .......................... 10 2005 049 077

(51) Int. Cl.
*H04W 4/00* (2009.01)
*H04B 7/00* (2006.01)
*H04L 12/16* (2006.01)

(52) U.S. Cl. ....................... 455/426.1; 455/518; 370/260

(58) Field of Classification Search ................ 455/426.1
See application file for complete search history.

(56) References Cited

U.S. PATENT DOCUMENTS

| | | | |
|---|---|---|---|
| 5,195,086 A | | 3/1993 | Baumgartner et al. |
| 5,608,651 A | * | 3/1997 | Leavy et al. ............... 348/14.12 |
| 6,687,234 B1 | * | 2/2004 | Shaffer et al. .................. 370/260 |
| 7,170,863 B1 | * | 1/2007 | Denman et al. ............... 370/260 |
| 7,283,489 B2 | * | 10/2007 | Palaez et al. .................. 370/277 |
| 2003/0021238 A1 | * | 1/2003 | Corneliussen et al. ....... 370/260 |
| 2003/0026245 A1 | * | 2/2003 | Ejzak ............................ 370/352 |
| 2004/0223489 A1 | | 11/2004 | Rotsten et al. |

FOREIGN PATENT DOCUMENTS

DE 10 2005 016 587 A1 10/2006

OTHER PUBLICATIONS

G. Camarillo et al.; "The Binary Floor Control Protocol (BFCP)"; XCON Working Group, Jul. 2005; pp. 1-79.
Open Mobile Alliance; PoC user Plane Version, Candidate Version 1.0, OMA-TS_PoC-UserPlane-V1_0-20050428-C; Apr. 2005; pp. 1-161.
H. Schulzrinne et al. ; "RTP: A Transport Protocol for Real-Time Applications"; Network Working Group, Request for Comments 3550; Jul. 2003; pp. 1-89.
Open Mobile Alliance; "Push to talk over Cellular (PoC)—Architecture", Candidate Version 1.0, OMA-AD_PoC-V1_0-20050428-C; Apr. 2005, pp. 1-156.
J. Rosenberg, et al.; "SIP: Session Initiation Protocol"; Network Working Group, Request for Cmments: 3261; Jun. 2002, pp. 1-196.
T. Bray et al; "Extensible Markup Lanugauge (XML) 1.1"; http://www.w3.org/TR/2004/REC-xml11-20040204/; Feb. 2004.
J. Rosenberg; "The Extensible Markup Language (XML) Configuration Access Protocol (XCAP)"; draft-ietf-simple-xcap-07; Internet-Draft, Jun. 2005; pp. 1-69.
J. Rosenberg; "A Framework for Conferencing with the Session Initation Protocol"; draft-ietf-sipping-conferencing-framework-00.txt; IETF Internet-Draft, May 2003; pp. 1-44.

* cited by examiner

*Primary Examiner* — Lester Kincaid
*Assistant Examiner* — Andy Gu
(74) *Attorney, Agent, or Firm* — Dickstein Shapiro LLP

(57) ABSTRACT

Media data from a first communication session and media data from a second communication session are received by a unit in the communication network and are combined therein to form at least one combined media data stream which contains the media data from the two communication sessions. The combined media data stream is sent to the communication terminal.

19 Claims, 5 Drawing Sheets

FIG 4

```
<? xml version="1.0" encoding="UTP-8"?>

<poc-settings xmlns="urn:oma:params:xml:ns:poc:poc-settings">

<isb-settings>
            <incoming-session-barring active="true">
        </isb-settings>

<am-settings>
            <answer-mode>automatic</answer-mode>
        </am-settings>

<ipab-settings>
            <incoming-personal-alert-barring active="false"/>
        </ipab-settings>

<mix-settings>
            <mixing medium="audio">
                <mix-type>additive<mix-type/>
                <sessions>1<sessions/>
            <mixing/>
            <mixing medium="video">
                <mix-type>top-to-bottom<mix-type/>
                <sessions>1 2<sessions/>
            <mixing/>
        </mix-settings>
</poc-settings>
```

400

METHOD AND APPARATUS FOR TRANSMITTING MEDIA DATA

CROSS-REFERENCE TO RELATED APPLICATION

This application claims priority to German Patent Application Serial No. 10 2005 049 077.8-31, which was filed on Oct. 13, 2005, and is incorporated herein by reference in its entirety.

FIELD OF THE INVENTION

The invention relates to a method for transmitting media data, to a communication network unit and to a computer program element.

BACKGROUND OF THE INVENTION

Conference communication systems allow a plurality of users to communicate with one another at the same time. A user can also participate in a plurality of conferences at the same time. By way of example, it is possible for the user to prioritize among the conferences and for him to receive media data from a conference only if no media data are being transmitted from the conferences with higher priority than the conference.

BRIEF DESCRIPTION OF THE INVENTION

FIG. 4 shows an XML document for stipulating the combination rules for combining media data streams from a plurality of communication sessions.

DETAILED DESCRIPTION OF THE INVENTION

Figure 1:
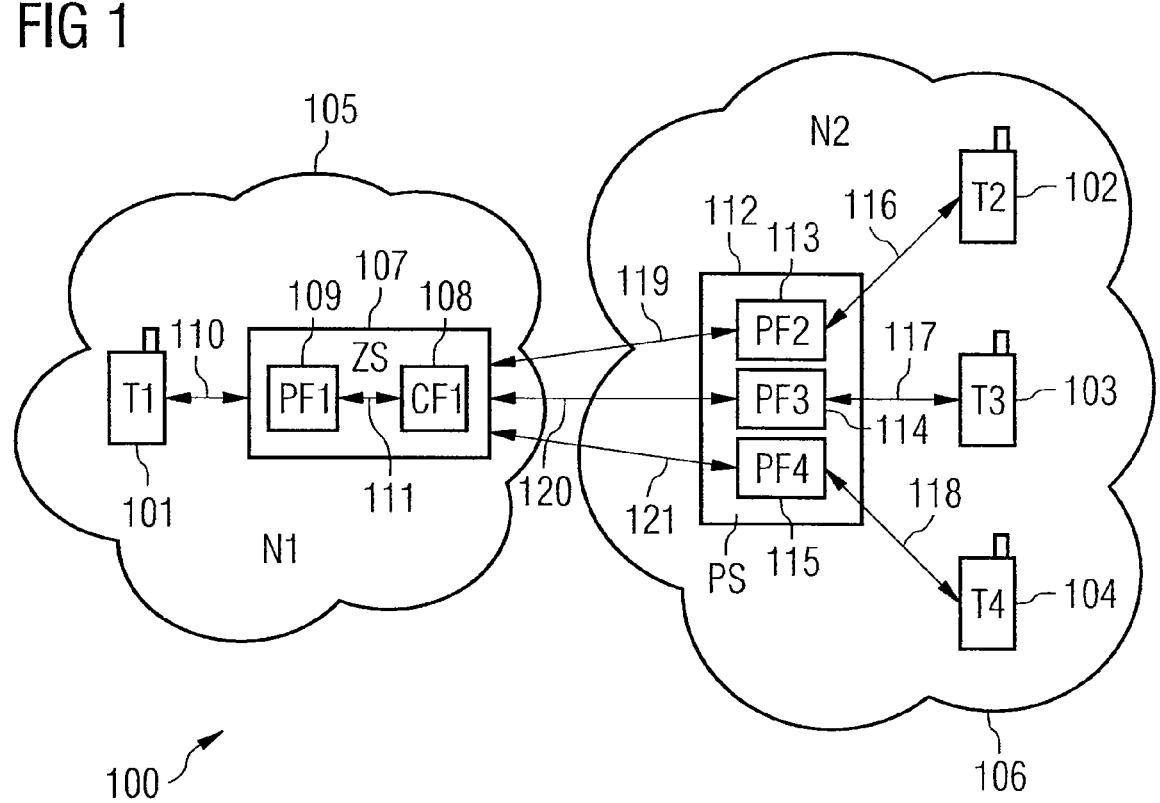
FIG. 1 shows a push-to-talk over cellular-communication system.

In a push-to-talk communication system (PTT communication system) it is possible to use mobile communication terminals for communication between a plurality of users. Just as in the case of walkie talkies, it is usually necessary for the speaker to press a special key on his mobile communication terminal in order to be able to transmit messages. If, upon pressing the key, the speaker is allocated the communication right (subsequently the allocation of communication rights is also called floor control), then the speaker can speak into the mobile communication terminal and the recorded voice signals are transmitted to the other subscribers in a push-to-talk communication session. During this time, the transmission of messages from other users in the PTT communication session is blocked. Within a PTT communication session, normally only one subscriber is ever provided with the right to talk, generally the communication right, i.e. for example the right to introduce data into the communication session. The media data are transmitted using a half-duplex transmission method.

In today's PTT communication systems, communication rights are requested and allocated using the Real-Time Transport Control Protocol (RTCP) communication protocol, for example. Alternatively, communication rights can also be controlled using the Binary Floor Control Protocol (BFCP) communication protocol.

PTT communication systems normally have a centralized architecture. This means that the subscribers in such PTT communication systems do not communicate with one another directly, but rather using a central server unit. The central server unit is situated in the non-mobile part of the communication network.

In PTT communication systems based on the Open Mobile Alliance (OMA) communication standard, which are also called push-to-talk over cellular communication systems (PoC communication systems), the central server unit has what is known as a controlling function (CF), also called PoC controlling server unit, and in general a plurality of participating functions (PFs) which communicate with the controlling function and which are also called PoC participating server units. Each subscriber has an associated participating function. The controlling function contains functionalities which are associated with the respective PTT communication session. A participating function contains functionalities which are associated with the subscriber, or his mobile radio communication terminal, associated with the participating function. A participating function is therefore clearly a part of the associated subscriber mobile radio communication terminal, this part being situated, i.e. arranged, in the non-mobile communication network. All participating functions are connected firstly to the controlling function of the communication session and secondly to their respective associated subscriber communication terminal.

If a PoC communication session has subscribers from various communication networks, the subscribers or their subscriber communication terminals communicate via a plurality of PoC server units. In this case, however, there is always just one central PoC server unit via which all the communication is routed. This central PoC server unit contains the controlling function and possibly participating functions, if the central PoC server unit's communication network contains subscribers in the communication session. All other server units contain only participating functions for the subscribers or for the subscriber communication terminals in the server unit's respective communication network.

FIG. 1 uses a block diagram to show the architecture of such a PTT communication system 100 having four subscriber communication terminals, namely having a first mobile radio communication terminal 101 associated with a first subscriber T1, having a second mobile radio communication terminal 102 associated with a second subscriber T2, having a third mobile radio communication terminal 103 associated with a third subscriber T3 and having a fourth mobile radio communication terminal 104 associated with a fourth subscriber T4.

The first mobile radio communication terminal 101 is registered in a first mobile radio communication network 105, which is provided and operated by a first mobile radio communication network operator.

The second mobile radio communication terminal 102, the third mobile radio communication terminal 103 and the fourth mobile radio communication terminal 104 are registered in a second mobile radio communication network 106, which is provided and operated by a second mobile radio communication network operator.

In this case, it is assumed that the first mobile radio communication network 105 contains a central PoC server unit 107 with a PoC controlling server unit 108, which forms a PTT communication session based on the OMA PTT communication standard, set up between the mobile radio communication terminals 101, 102, 103, 104.

In addition, the central PoC server unit 107 contains a first PoC participating server unit 109. The first PoC participating server unit 109 is associated with the first mobile radio communication terminal 101 and is connected thereto by means of a bidirectional first mobile radio communication link 110. In addition, a bidirectional first communication link 111 is provided between the first PoC participating server unit 109 and the PoC controlling server unit 108.

In the second mobile radio communication network 106, a local PoC server unit 112 contains three further PoC participating server units, namely a second PoC participating server unit 113 associated with the second mobile radio communication terminal 102, a third PoC participating server unit 114 associated with the third mobile radio communication terminal 103 and a fourth PoC participating server unit 115 associated with the fourth mobile radio communication terminal 104. The second PoC participating server unit 113 is connected to the second mobile radio communication terminal 102 by means of a bidirectional second mobile radio communication link 116, and the third PoC participating server unit 114 is connected to the third mobile radio communication terminal 103 by means of a bidirectional third mobile radio communication link 117. In addition, the fourth PoC participating server unit 115 is connected to the fourth mobile radio communication terminal 104 by means of a bidirectional fourth mobile radio communication link 118.

Also, the PoC participating server units 113, 114, 115 in the second mobile radio communication network 106 are connected to the PoC controlling server unit 108 by means of a respective bidirectional communication link, with the second PoC participating server unit 113 being connected to the PoC controlling server unit 108 by means of a bidirectional second communication link 119, the third PoC participating server unit 114 being connected to the PoC controlling server unit 108 by means of a bidirectional third communication link 120, and the fourth PoC participating server unit 115 being connected to the PoC controlling server unit 108 by means of a bidirectional fourth communication link 121.

This means that a subscriber from a communication network without a PoC controlling server unit can communicate with the PoC communication session using a PoC server unit from its own mobile radio communication network (which unit contains the respective participating function) with the central PoC server unit from the foreign mobile radio communication network and with the PoC controlling server unit therein.

A PoC subscriber can participate in a plurality of PoC communication sessions at the same time. In this case, however, the subscriber or his mobile radio communication terminal can only ever receive the media data from one PoC communication session at a time. If media data are being transmitted in various PoC communication sessions at the same time, the receiver receives media data only from one PoC communication session (normally from the one which he has specified as primary)—also called primary session. The media data from the other PoC communication sessions (also called secondary session(s)) in which the subscriber is participating are not forwarded by the respective participating function which is associated with the respective subscriber's mobile radio communication terminal.

If a subscriber is participating in a plurality of PoC communication sessions at the same time, RTP (Real-Time transport Protocol) communication links and RTCP (Real-Time transport Control Protocol) communication links for transmitting media data or communication-session-specific control data exist between each controlling function, i.e. between each PoC controlling server unit in the PoC communication session and the subscriber communication terminal, even though media data are only ever interchanged with no more than one of the PoC communication sessions.

When participating in a plurality of PoC communication sessions at the same time, the prior art has the drawback that the subscriber does not receive the media data from secondary, in other words lower-ranking, PoC communication sessions.

In line with one exemplary embodiment of the invention, media data from a plurality of communication sessions can be transmitted to a communication terminal easily and inexpensively.

In the case of a method for transmitting media data from a first communication session and media data from a second communication session, where a communication terminal participates in the first communication session and in the second communication session, in line with one exemplary embodiment of the invention, the media data from the first communication session and the media data from the second communication session are received by a unit in the communication network. The media data are combined in the unit in the communication network to form at least one combined media data stream, where the at least one combined media data stream contains at least media data from the first communication session and media data from the second communication session. The at least one combined media data stream is sent to the communication terminal.

A communication network unit for transmitting media data from a first communication session and media data from a second communication session, where a communication terminal participates in the first communication session and in the second communication session, in line with an exemplary embodiment of the invention has a receiver for receiving media data from the first communication session and media data from the second communication session. In addition, a media data combination unit is provided for combining the media data to form at least one combined media data stream, where the combined media data stream contains at least media data from the first communication session and media data from the second communication session. Furthermore, a transmitter is provided for sending the at least one combined media data stream to the communication terminal.

In line with one exemplary embodiment of the invention, a computer program element is provided which, when executed by means of a computer, for example a processor, has the method described above.

In the case of one exemplary embodiment of the invention, a unit in the communication network, i.e. for example a unit in the non-mobile part of the communication system, combines media data from different communication sessions to form a (common) media data stream and transmits just one media data stream to the communication terminal, which is thus put in a position to receive media data from different communication sessions at the same time easily and inexpensively.

Since the media data combination, in other words the media data mixing, is performed in a unit in the communication network, it is not necessary to provide the communication terminal with increased computation power for processing the media data in different communication sessions. This means that the communication terminal does not need to be altered in practice and can continue to be manufactured inexpensively.

In general, the subscriber in a plurality of communication sessions loses no or little media data produced in the course of different communication sessions.

In line with one refinement of the invention, a respective (separate) combined media data stream is produced and sent to the communication terminal per medium, a medium being understood to mean video data, still-picture data, audio data, textual data, etc., for example.

By way of example, if provision is made for only the video data from different communication sessions to be combined then only a combined video media data stream is formed and sent to the communication terminal, and only one of the audio media data streams is sent to the communication terminal.

However, by way of example, an alternative refinement of the invention has provision to combine both video data and audio data from respective different communication sessions; for example a combined video media data stream and a combined audio data stream are formed and these two media data streams are sent to the communication terminal.

This allows media, in other words the media data streams to be combined on the basis of combination rules (mixing rules) which can each be prescribed independently of one another and which can be matched to the specifics of the respective media if appropriate. This allows very simple and flexible combination of the media data streams from different communication sessions in a manner which is specific to media data.

The first communication session and/or the second communication session may be (a) half-duplex communication session(s), for example (a) push-to-talk communication session(s), in this case for example (a) push-to-talk over cellular communication session(s), for example on the basis of the Open Mobile Alliance (OMA) communication standard or on the basis of the "Direct Connect" communication standard from the company Nextel in the USA.

A PTT communication session is to be understood to mean, by way of example, a communication session in which no more than one subscriber in the communication session has been allocated the communication right at a time, i.e. for example the right to introduce data (media) into the communication session. By way of example, the communication right with which the subscriber is provided is a right to talk, i.e. for example the right to introduce voice data into the communication session. When a subscriber in the communication session is provided with a communication right, the other subscribers in the communication session are only able to receive data and cannot themselves introduce any data into the communication session, in other words they are blocked from introducing their own data into the communication session.

If the first communication session and/or the second communication session is/are (a) push-to-talk over cellular communication session(s) then, in line with one embodiment of the invention, provision may be made for the unit in the communication network to be a push-to-talk over cellular participating server unit (PoC participating server unit).

Alternatively, the first communication session and/or the second communication session may be (an) Internet-based communication session(s), for example designed on the basis of the communication standard from the IETF (Internet Engineering Task Force), known as the Internet Conferencing Framework.

The at least one combined media data stream may be sent via a mobile radio interface to the communication terminal. It should be pointed out that embodiments of the invention may also be used in a landline communication network.

In addition, the at least one combined media data stream can be combined on the basis of prescribed combination rules, the combination rules being able to be prescribed by the subscriber on the communication terminal with which the unit in the communication network is associated.

This allows the unit in the communication network to be configured very flexibly by the user in terms of the strategy for combining the media data from different communication sessions, as desired by the subscriber.

In line with another refinement of the invention, between the unit in the communication network and the communication terminal at least one useful data communication link and at least one control data communication link are respectively set up for each communication session, and the useful data are transmitted just using (precisely) one useful data communication link from the plurality of useful data communication links (alternatively using a plurality of but not all useful data communication links, in other words using some of the useful data communication links) and the communication-session-specific control data are transmitted using the respective control data communication link for the communication session to which the respective control data relate.

In line with another refinement of the invention, between the unit in the communication network and the communication terminal at least one useful data communication link is set up for a plurality of communication sessions and at least one respective control data communication link is set up for each communication session. The useful data are transmitted using the useful data communication link, and the communication-session-specific control data are transmitted using the respective control data communication link for the communication session to which the respective control data relate.

In line with one refinement of the communication network unit, the media data combination unit is set up such that it produces a respective combined media data stream per medium.

The communication network unit can be set up to communicate on the basis of a half-duplex communication session protocol, for example on the basis of a push-to-talk communication session protocol, and in this context on the basis of a push-to-talk over cellular communication session protocol, for example, or alternatively on the basis of the "Direct Connect" communication session protocol from the company Nextel in the USA.

In addition, the communication network unit can be set up as a push-to-talk over cellular participating server unit, in general as a participating function within a push-to-talk over cellular communication session system.

Alternatively the communication network unit can be set up to communicate on the basis of an Internet-based communication session protocol.

In this case, a dedicated media mixer may be provided for mixing together media data from a plurality of communication sessions.

In line with another embodiment of the invention, the media data combination unit is set up such that it combines the media data on the basis of prescribed combination rules which can be prescribed by the subscriber on the communication terminal, for example.

In line with another refinement of the invention, the communication network unit has a communication link setup unit for setting up a respective useful data communication link and a respective control data communication link to the communication terminal for each communication session. In addition, this refinement of the invention has the transmitter set up such that the useful data are transmitted just using one useful data communication link from the plurality of useful data communication links, or alternatively some of the plurality of useful data communication links, and that the communication-session-specific control data are transmitted using the respective control data communication link for the communication session to which the respective control data relate.

In line with another embodiment of the invention, the communication network unit has a communication link setup unit for setting up a common useful data communication link for a plurality of communication sessions and for setting up a respective control data communication link to the communication terminal for each communication session. In line with this refinement of the invention, the transmitter is set up, by way of example, such that the useful data are transmitted using the useful data communication link and such that communication-session-specific control data are transmitted using the respective control data communication link for the communication session to which the respective control data relate.

In line with one exemplary embodiment of the invention in application to a PTT communication system, the data from a medium from a plurality of communication sessions are combined in the participating function of a subscriber, in other words are mixed together, and the resulting media data stream is transmitted to the subscriber, to be more precise to the respective subscriber's communication terminal. In this context, the subscriber can determine how data from the communication sessions are mixed together. The subscriber or his communication terminal receives just one resulting media data stream per medium.

In line with one refinement of the invention, a subscriber participating in a plurality of PTT communication sessions at the same time can use particular messages provided for the purpose to notify his associated participating function (i.e. his PoC participating server unit) of the way in which the participating function is meant to mix together the data from a medium from the communication sessions, i.e. from different communication sessions. The participating function mixes together the data from a medium from the different communication sessions of the associated subscriber in line with the mixing requirements, in other words in line with the mixing rules, of the subscriber, or of his communication terminal to form a single resulting media data stream (the combined media data stream), and sends the resulting media data stream to the subscriber or to his communication terminal.

The resulting media data stream can be sent to the subscriber or to his communication terminal in two different ways, for example:

For each communication session, a useful data communication link is set up with the associated control data communication link from the participating function to the subscriber or to his communication terminal. The resulting media data stream is transmitted just using one of the plurality of useful data communication connections which have been set up, however, the other useful data communication links not being used to transmit any useful data. The control data communication links associated with the useful data communication links, i.e. allocated to them, are used for transmitting communication-session-specific messages, for example for communication rights control.

Just one useful data communication link is set up from the participating function to the subscriber or to his communication terminal. For each of the communication sessions, however, a control data communication link associated with the useful data communication link is set up. The useful data are transmitted using the one useful data communication link. The control data communication links are used for transmitting communication-session-specific messages.

An advantage of this embodiment of the invention is that a communication terminal belonging to a PTT subscriber can receive media data from a plurality of PTT communication sessions which are in progress at the same time and can output them to the subscriber. This means that the subscriber does not lose media data from communication sessions which are in progress at the same time, as previously.

Another advantage is that transmitting the media data from a plurality of communication sessions from the communication network to the, for example, mobile communication terminal requires only a relatively small transmission bandwidth, since the media data are mixed together in the participating function which is in the communication network, and only one resulting media data stream is transmitted to the communication terminal per medium.

Another advantage is that optionally the subscribers can determine the way in which media data are to be mixed together.

The media mixing, in other words the media data stream combination, requires no additional computation power in the communication terminals.

In addition, it is not necessary for previously known PoC communication systems to be altered fundamentally, since the procedure described above is compatible with previously known PoC communication systems. Furthermore, the procedure merely extends performance in a PoC communication system, and the PoC communication systems do not have their fundamental properties altered.

This means that the embodiments of the invention which are described above will require only little additional complexity for existing PoC communication systems.

In addition, it clearly becomes possible to mix the media data from different communication sessions in push-to-talk communication systems.

It should be pointed out that embodiments of the invention can be applied to any type of communication-session-based communication systems in which it is possible for a communication terminal or its subscriber to participate in a plurality of communication sessions at the same time. The specific embodiments of the communication system or of the protocols used in the communication sessions is basically arbitrary.

Elements which are the same or similar in the figures have been provided with identical reference symbols where appropriate.

Figure 2:
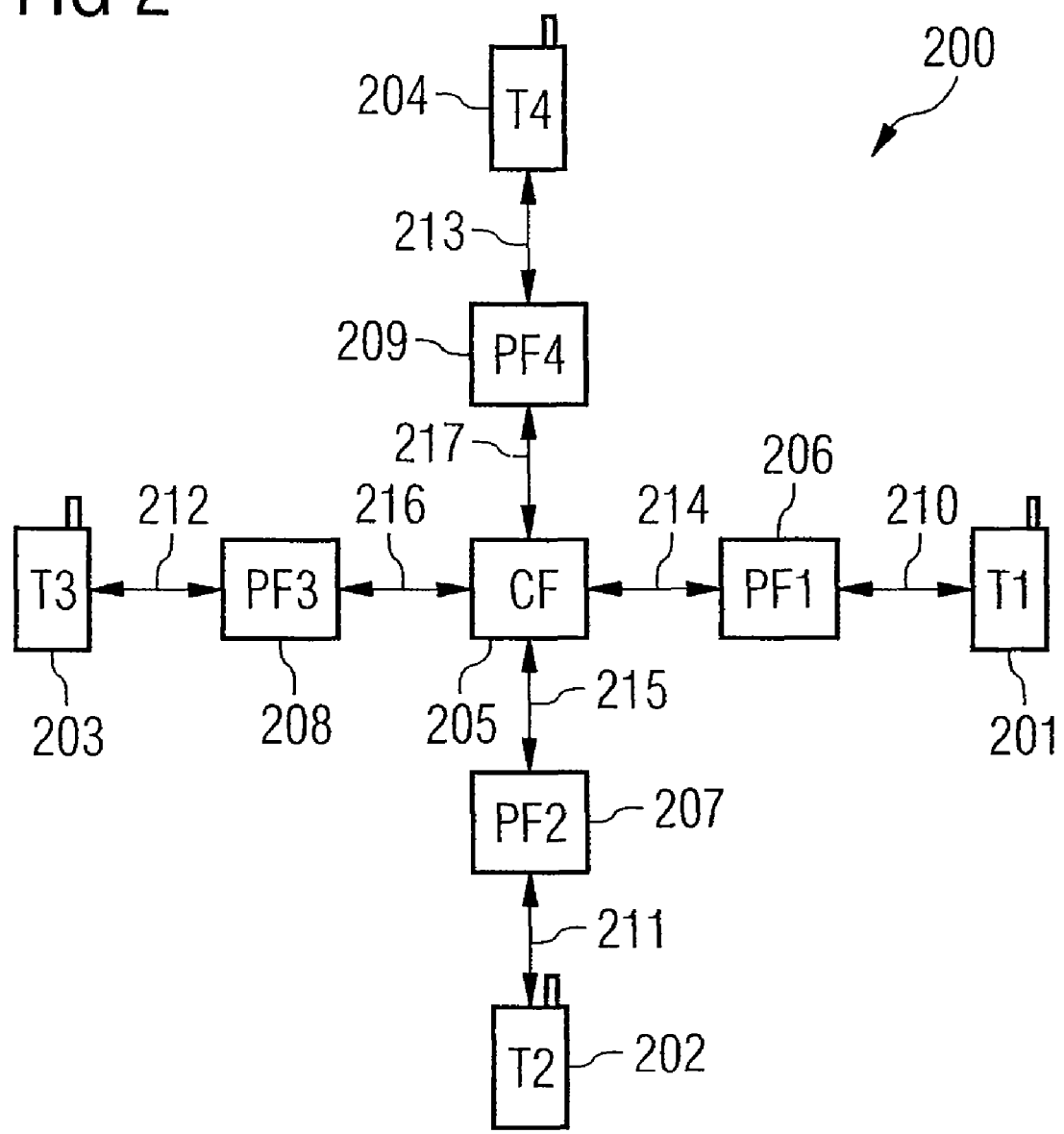
FIG. 2 shows a push-to-talk over cellular communication system based on an exemplary embodiment of the invention with a communication session.

FIG. 2 shows a push-to-talk over cellular communication system 200 based on an exemplary embodiment of the invention. The individual components of the push-to-talk over cellular communication system 200, as are described below, are configured on the basis of the Open Mobile Alliance (OMA) communication standard. In addition, the individual components are set up such that the procedures described below are implemented.

The individual units can be produced in software, i.e. using an appropriate computer program, in hardware, i.e. using an appropriate specific electrical circuit, or in arbitrarily hybrid form, i.e. in software and/or in hardware in any proportions.

On the basis of the PoC communication standard, the subscribers communicate with one another, not directly but rather via a push-to-talk over cellular server unit. The push-to-talk over cellular server unit has a controlling function (for each communication session) and a respective participating function per subscriber. In this case, it is assumed that all subscribers belong to the PoC server unit's communication network.

FIG. 2 shows the PoC communication system 200 in detail. As FIG. 2 shows, a plurality, basically any number, of subscribers and their mobile radio communication terminals are provided in the PoC communication system 200, in line with this exemplary embodiment of the invention a first mobile radio communication terminal 201 belonging to a first subscriber T1, a second mobile radio communication terminal 202 belonging to a second subscriber T2, a third mobile radio communication terminal 203 belonging to a third subscriber T3, a fourth mobile radio communication terminal 204 belonging to a fourth subscriber T4.

The four mobile radio communication terminals 201, 202, 203, 204 or their subscribers are connected to one another in a first PoC communication session as part of a communication conference. For this, the first communication session has a unit controlling the PoC communication session, namely the controlling function (CF), subsequently also called the first PoC controlling server unit 205.

In addition, each mobile radio communication terminal 201, 202, 203, 204 has a respective participating function associated with it, subsequently also called the PoC participating server unit. This means that a first PoC participating server unit 206 is provided for and associated with the first mobile radio communication terminal 201. In addition, the second mobile radio communication terminal 202 has a second PoC participating server unit 207 provided for and associated with it. In addition, the third mobile radio communication terminal 203 has a third PoC participating server unit 208 provided for and associated with it. Finally, the fourth mobile radio communication terminal 204 has a fourth PoC participating server unit 209 provided for and associated with it.

The respective mobile radio communication terminals 201, 202, 203, 204 are connected to their respective associated PoC participating server unit 206, 207, 208, 209 by means of a respective bidirectional mobile radio communication link 210, 211, 212, 213.

In addition, the respective PoC participating server units 206, 207, 208, 209 are connected to the first PoC controlling server unit 205 on the server side by means of a respective bidirectional communication link 214, 215, 216, 217.

Hence, in line with this exemplary embodiment of the invention, four subscribers are participating in the first PoC communication session, in general in a first push-to-talk-communication session. The subscribers or their mobile radio communication terminals communicate using audio and/or video as media data.

Figure 3:
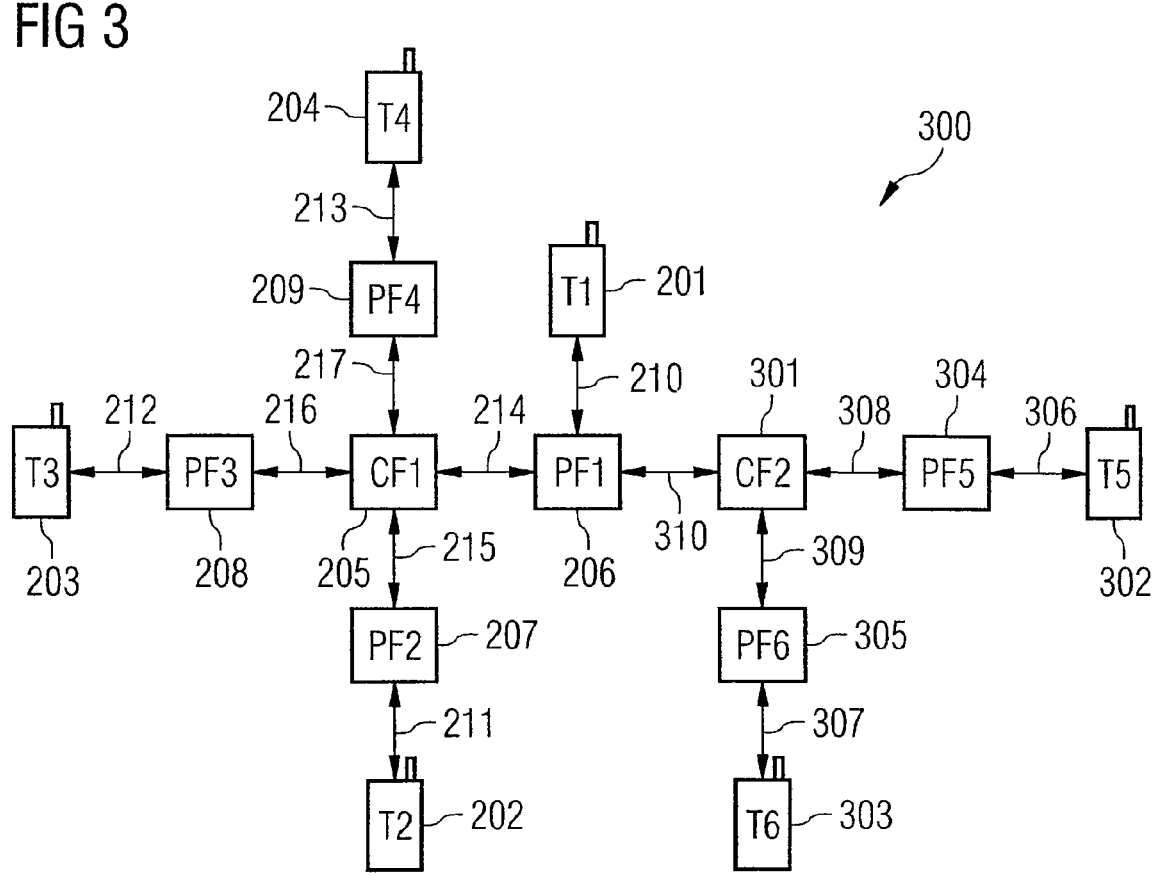
FIG. 3 shows the push-to-talk over cellular communication system based on the exemplary embodiment of the invention with two communication sessions.

In addition, in line with this exemplary embodiment, it is assumed that, as shown in the block diagram 300 in FIG. 3, there are also two further subscribers or their mobile radio communication terminals which, together with the first subscriber T1 or his first mobile radio communication terminal 201, are participating in a second PoC communication session, in general a second PTT communication session.

The media data are likewise transmitted using audio media data and/or video media data as part of the second communication session.

For the second PoC communication session, a second PoC controlling server unit 301 is provided in order to control it.

In addition, as described above, the subscribers in the second PoC communication session are the first subscriber T1, a fifth subscriber T5, who is using a fifth mobile radio communication terminal 302 to participate in the second PoC communication session, and a sixth subscriber T6, who is using a sixth mobile radio communication terminal 303 to participate in the second PoC communication session. In addition, a fifth PoC participating server unit 304 is provided which is associated with the fifth mobile radio communication terminal 302. Furthermore, a sixth PoC participating server unit 305 is provided which is associated with the sixth mobile radio communication terminal 303.

The fifth PoC participating server unit 304 is connected to the fifth mobile radio communication terminal 302 by means of a bidirectional fifth mobile radio communication link 306, and the sixth PoC participating server unit 305 is connected to the sixth mobile radio communication terminal 303 by means of a bidirectional sixth mobile radio communication link 307.

In addition, the fifth PoC participating server unit 304 is connected to the second PoC controlling server unit 301 by means of a bidirectional fifth communication link 308. Furthermore, the sixth PoC participating server unit 305 is likewise connected to the second PoC controlling server unit 301 by means of a bidirectional sixth communication link 309. Also, the second PoC controlling server unit 301 is connected to the first PoC participating server unit 206 by means of a bidirectional seventh communication link 310 and to the first mobile radio communication terminal 201 via the first PoC participating server unit 206 and by means of the first mobile radio communication link 210.

Within the context of this exemplary embodiment of the invention, it is assumed that the first subscriber T1 or the first mobile radio communication terminal 201 wishes to receive the video data from both PoC communication sessions and the audio data just from the first PoC communication session from the two PoC communication sessions.

Hence, in line with this exemplary embodiment of the invention, the first subscriber T1 or his first mobile radio communication terminal 201 notifies the first PoC participating function 210 that it needs to mix together the video media data stream from both PoC communication sessions such that the first PoC communication session is represented in the top part of the resulting video media data stream and the second PoC communication session is represented in the bottom part of the video media data stream produced.

Furthermore, the first subscriber T1 or the first mobile radio communication terminal 201 notifies the first PoC participating server unit 206 that only the audio media data from the first PoC communication session need to be forwarded to it and the audio data from the second PoC communication session need to be rejected.

Figure 5:
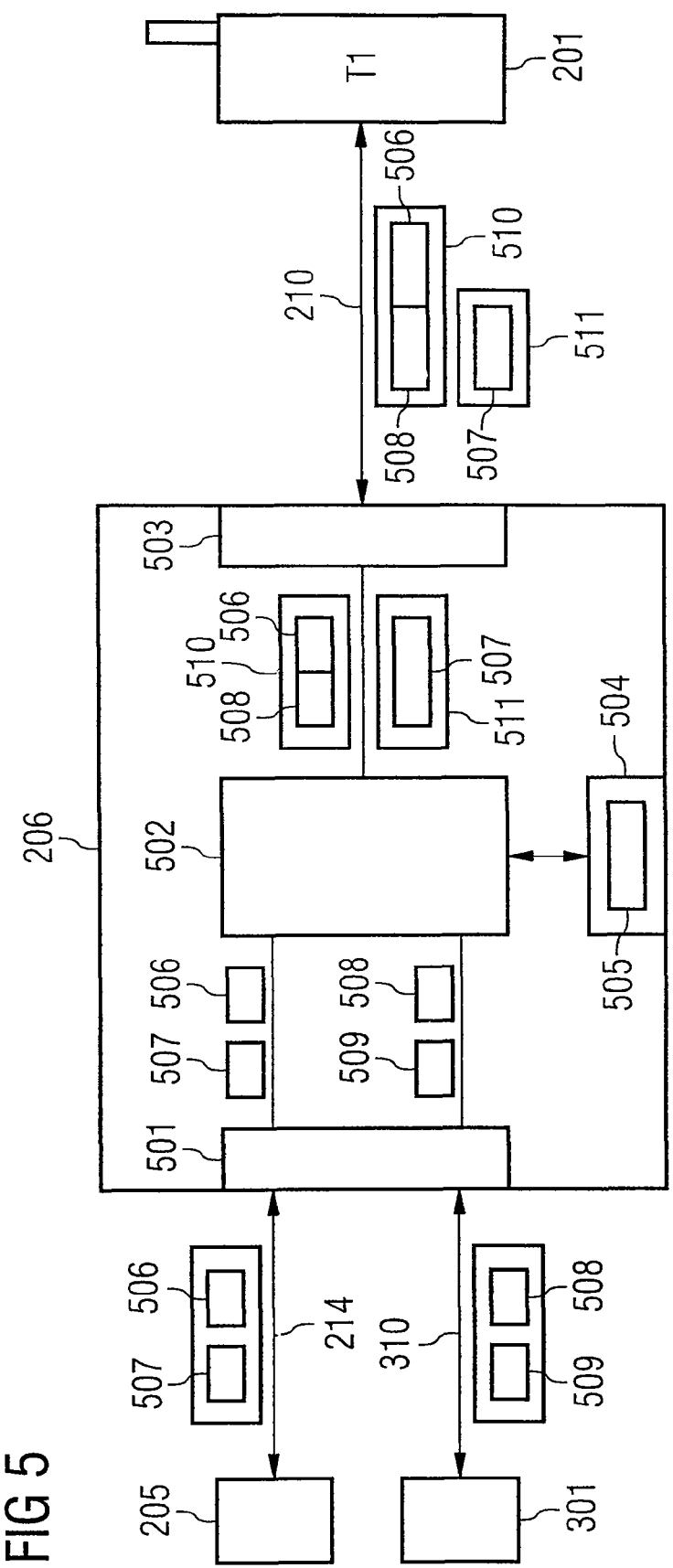
FIG. 5 shows a sketch of a PoC participating server unit based on an exemplary embodiment of the invention.

FIG. 5 shows the structure of the first PoC participating server unit 206 in detail. It should be pointed out that the other PoC participating server units are of corresponding design.

In addition to the fundamental functionalities of a PoC participating server unit, the first PoC participating server unit 206 in line with this embodiment of the invention has a receiver 501 for receiving media data from the first communication session using the first communication link 214 from the first PoC controlling server unit 205 and media data from the second communication session using the seventh communication link 310 from the second PoC controlling server unit 301.

In addition, a media data combination unit 502 coupled to the receiver 501 is provided for combining the received media data to form at least one combined media data stream, as explained in more detail below.

Furthermore, a transmitter 503 is provided for sending the combined media data stream produced or the plurality of combined media data streams produced to the first mobile radio communication terminal 201 using the first mobile radio communication link 210. In addition, the first PoC participating server unit 206 contains a memory 504 which stores combination rules, subsequently also called mixing rules 505, for example in the form of one or more XML files.

The media data combination unit 502 combines the received media data to form the combined media data stream or to form a plurality of combined media data streams on the basis of the combination rules 505 which are stored in the memory 504 and which have been prescribed by the first subscriber T1, as described above.

As FIG. 5 shows, the receiver 501 therefore receives a first video data stream 506 and a first audio media data stream 507 from the first PoC communication session and also a second video media data stream 508 and a second audio media data stream 509 from the second PoC communication session.

As specified in the combination rules 505, the media data combination unit 502 is intended, as has been described above, to combine the video media data streams 506, 508 from both PoC communication sessions to form a common combined video media data stream 510 such that the first video media data stream 506 from the first PoC communication session is shown in the top part of the screen when the resulting video media data stream is being shown on the first mobile radio communication terminal 201, and the second video media data stream 508 from the second PoC communication session is shown in the bottom part of the screen of the first mobile radio communication terminal 201.

Hence, the first video media data stream 506 from the first PoC communication session and the second video media data stream 508 from the second PoC communication session are combined to form a combined video media data stream 510 containing these two video media data streams 506, 508, and are transmitted to the first mobile radio communication terminal 201 and hence to the first subscriber Ti by means of the transmitter 503 and the first mobile radio communication link 210.

In addition, in line with the audio combination rule 505 which is stored in the memory 504 and which is used to indicate that only the first audio media data stream 507 from the first PoC communication link needs to be transmitted to the first mobile radio communication terminal 201, the received second audio media data stream 509 is rejected in the media data combination unit 502, and a combined audio media data stream 511 is formed, which in this case contains only the first audio media data stream 507. The combined audio media data stream 511 is likewise transmitted to the first mobile radio communication terminal 201 by means of the transmitter 503 and the first mobile radio communication link 210.

In this connection, it should be noted that in principle any kind of mixing of media data streams may be provided, and when audio data are being mixed, for example, it is possible either to superimpose the audio data or to transmit the audio media data using two different channels within the context of two-channel audio transmission (stereo), in which case the audio data from both PoC communication sessions can be presented to the first subscriber T1 using different channels. Alternatively, it is possible to add at least some of the second audio media data stream from the second PoC communication session to the first audio media data stream from the first PoC communication session during pauses in speech, and hence both audio media data streams can be combined to form the combined audio media data stream containing these two audio media data streams. In line with another alternative refinement of the invention, provision is made for the audio media data streams to be compressed, i.e. for the speed of speech to be increased in the voice signals which are to be transmitted and for the additional pauses in speech which are formed as a result in the first audio media data stream to have at least some of the second audio media data stream from the second PoC communication session or an additional audio media data stream from a respective further PoC communication session added to it.

In summary, the first PoC participating server unit 206, having received the video media data streams 506, 508 from the two PoC communication sessions, then produces a combined video media data stream 510, containing the video pictures from both PoC communication sessions in reduced form, and forwards the combined video media data stream 510 produced to the first mobile radio communication terminal 201. The first PoC participating server unit 206 forwards the audio data from the first PoC communication session in the combined audio media data stream 511 directly to the first mobile radio communication terminal 201 and hence to the first subscriber T1.

To transmit the media data from the first PoC participating server unit 206 to the first mobile radio communication terminal 201 and hence to the first subscriber T1, the RTP communication links from the first PoC communication session are used. The RTP communication links from the second PoC communication session are not used to transmit any data. By contrast, the RTCP communication links from both communication sessions are used to transmit communication rights allocation messages (for example talk burst control messages).

The subscriber terminal, i.e. the first mobile radio communication terminal 201, for example, receives no separate notification about which of the possible RTP communication links from the two PoC communication sessions are being used to send the media data. Instead, the mobile radio communication terminal 201 independently recognizes that the media data are being received using the RTP communication link from the first PoC communication session.

It is also assumed that the first mobile radio communication terminal 201 and hence the first subscriber T1 leaves the first PTT communication session, i.e. in line with this exemplary embodiment of the invention the first PoC communication session.

The first PoC participating server unit 206 now no longer mixes together video data but rather forwards the video data from the second PoC communication session directly to the first mobile radio communication terminal 201 and hence to the first subscriber T1.

For the purpose of transmission, the video RTP communication link from the second PoC communication session is now used. The first mobile radio communication terminal 201 and hence the first subscriber T1 now receives no further data using the video RTP communication link from the first PoC communication session, but rather receives them using the video RTP communication link from the second PoC communication session and outputs these data for the user, i.e. the first subscriber T1.

To notify the first PoC participating server unit 206 about how media data streams from a plurality of PoC communication sessions need to be mixed together, this embodiment of the invention involves the first mobile radio communication terminal 201, in general all subscriber communication terminals, using the Session Initiation Protocol (SIP). Using an SIP protocol message PUBLISH, the first mobile radio communication terminal 201 conveys to its home PoC server, i.e. in this case the first PoC participating server unit 206, how the media data need to be mixed together.

By way of example, the following stipulations may be communicated in the PUBLISH protocol message:
  media data type (for example audio, video, textual data, etc.);

a statement indicating how the media data streams from a plurality of PoC communication sessions of one media data type need to be mixed together; the manner in which they are mixed together may also be indicated on the basis of the number of PoC communication sessions;

a statement indicating which PoC communication sessions need to be mixed together.

If one of the stipulations cited above is not met by the mobile radio communication terminal, in general the subscriber terminal, then the respective PoC participating server unit uses a default value for it.

In line with this embodiment of the invention, the first subscriber T1 and hence the first mobile radio communication terminal 201 first of all stipulates that the audio media data streams need to be mixed together additively and that only the audio media data stream from the first PoC communication session is to be "mixed" and that the video media data streams are to be mixed together such that they are shown above one another on a screen of the first mobile radio communication terminals 201, and that the video media data streams from the first PoC communication session and from the second PoC communication session need to be mixed, with the video media data stream from the first PoC communication session being shown on the screen of the first mobile radio communication terminal 201 above the video media data stream from the second PoC communication session.

FIG. 4 uses a diagram 400 to show an appropriate XML document (XML: Extensible Markup Language), which is sent to the first PoC participating server unit 206 using a PUBLISH protocol message from the first mobile radio communication terminal 201 belonging to the first subscriber T1.

The text below explains a few alternatives for the embodiments described above.

Instead of transmitting the description of the mixing, in other words the statement indicating the mixing rules (combination rules), of media data streams to the push-to-talk over cellular participating server unit using a PUBLISH protocol message, the subscriber terminal and hence the first mobile radio communication terminal 201, for example, can also use the XCAP communication protocol (XCAP: XML Configuration Access Protocol) from the IETF (Internet Engineering Task Force) to send the description of the mixing.

The subscriber terminal sends the XCAP protocol messages to the PoC participating server unit or to another server which is provided for storing the mixing descriptions. The XCAP protocol messages are used to manipulate an XML document which describes the media mixing and, by way of example, is stored in the memory 504 of the first PoC participating server unit 206.

Instead of modifying the XML document 400 for media description using the XCAP communication protocol, another suitable communication protocol may also be used for this purpose.

Instead of describing the media mixing on the basis of XML syntax, as illustrated in FIG. 4, for example, it is also possible to use another XML syntax.

It should also be pointed out that the media mixing can also be described by other documents than using XML documents.

In addition, instead of having the subscriber terminal itself determine the RTP communication links which are used to transmit the media data to the mobile radio communication terminal, provision may also be made for the mobile radio communication terminal to be notified, before the transmission, about what RTP communication links are being used to send the media data. This notification can be provided using the SIP, for example.

Instead of setting up a plurality of RTP communication links for a plurality of PoC communication sessions per medium, provision may also be made for just one RTP communication link to be set up per medium. However, a plurality of RTCP control communication links are set up for this RTP communication link. One RTCP communication link is set up per PoC communication session. This RTCP communication link is used to transmit communication rights allocation protocol messages from the associated PoC communication session.

Embodiments of the invention may also be used in other communication systems using protocols other than SIP, SDP (Session Description Protocol), BFCP, RTP or RTCP.

In particular, it is not necessary for the media data to be transmitted using RTP/RTCP and for the communication rights allocation protocol messages to be transmitted by RTCP. Any other suitable communication protocol may be used for transmitting these data.

In addition, embodiments of the invention may be used not only in PTT communication systems for transmitting audio media data and/or video media data but also in other systems for transmitting other data, in general any media data.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of transmitting media data from a first communication session and media data from a second communication session, wherein a communication terminal participates in the first communication session and in the second communication session, the method comprising:
   receiving the media data from the first communication session and the media data from the second communication session by a unit in the communication network, wherein each of the first communication session and the second communication session is a half-duplex communication session;
   combining, based on prescribed and stored combination rules, the media data in the unit in the communication network to form at least one combined media data stream which contains media data of a media data type from the first communication session and the media data of the media data type from the second communication session; and
   transmitting the at least one combined media data stream to the communication terminal, so that media data from different communication sessions are sent to the communication terminal,
   wherein the combination rules are prescribed by a subscriber on the communication terminal and stored in a file of a memory located in a server, and
   wherein the prescribed and stored combination rules indicate, for each type of media data, the media data from which of the first communication session and the second communication session is to be combined.

2. The method according to claim 1, further comprising producing and transmitting to the communication terminal a respective combined media data stream per medium.

3. The method according to claim 1, wherein each of the first communication session and the second communication session is a push-to-talk communication session.

4. The method according to claim 3, wherein each of the first communication session and the second communication session is a push-to-talk over cellular communication session.

5. The method according to claim 4, wherein the unit in the communication network is a push-to-talk over cellular participating server unit.

6. The method according to claim 1, wherein each of the first communication session and the second communication session is an Internet-based communication session.

7. The method according to claim 1, further comprising transmitting the at least one combined media data stream via a mobile radio interface to the communication terminal.

8. The method according to claim 1, further comprising:
setting up, between the unit and the communication terminal, at least one useful data communication link and at least one control data communication link, respectively, for each communication session;
transmitting the useful data using only one useful data communication link from a plurality of useful data communication links; and
transmitting communication-session-specific control data using the respective control data communication link for the communication session to which the respective control data relate.

9. The method according to claim 1, further comprising:
setting up, between the unit and the communication terminal, at least one useful data communication link for a plurality of communication sessions and at least one respective control data communication link for each communication session;
transmitting the useful data using the useful data communication link; and
transmitting communication-session-specific control data using the respective control data communication link for the communication session to which the respective control data relate.

10. A communication network unit transmitting media data from a first communication session and media data from a second communication session, wherein a communication terminal participates in the first communication session and in the second communication session, the communication network unit comprising:
a receiver receiving media data from the first communication session and media data from the second communication session, wherein each of the first communication session and the second communication session is accomplished according to a half-duplex communication session protocol;
a media data combiner combining, based on prescribed and stored combination rules, the media data to form at least one combined media data stream which contains media data of a media data type from the first communication session and media data of the media data type from the second communication session; and
a transmitter transmitting the at least one combined media data stream to the communication terminal, so that media data from different communication sessions are transmitted to the communication terminal,
wherein the combination rules are prescribed by a subscriber on the communication terminal and stored in a file of a memory located in a server, and
wherein the prescribed and stored combination rules indicate, for each type of media data, the media data from which of the first communication session and the second communication session is to be combined.

11. The communication network unit according to claim 10, wherein the media data combiner produces a respective combined media data stream per medium.

12. The communication network unit according to claim 10, which communicates based on a push-to-talk communication session protocol.

13. The communication network unit according to claim 12, which communicates based on a push-to-talk over cellular communication session protocol.

14. The communication network unit according to claim 13, set up as a push-to-talk over cellular participating server unit.

15. The communication network unit according to claim 10, which communicates based on an Internet-based communication session protocol.

16. The communication network unit according to claim 10, further comprising:
a communication link setup unit which respectively sets up a useful data communication link and a control data communication link to the communication terminal for each communication session,
wherein the transmitter transmits the useful data using only one useful data communication link from a plurality of useful data communication links; and
wherein the transmitter transmits communication-session-specific control data using the respective control data communication link for the communication session to which the respective control data relate.

17. The communication network unit according to claim 10, further comprising:
a communication link setup unit which sets up a common useful data communication link for a plurality of communication sessions and sets up a respective control data communication link to the communication terminal for each communication session,
wherein the transmitter transmits the useful data using the common useful data communication link, and
wherein the transmitter transmits communication-session-specific control data using the respective control data communication link for the communication session to which the respective control data relate.

18. A processor executing a computer program element for transmitting media data from a first communication session and media data from a second communication session, wherein a communication terminal participates in the first communication session and in the second communication session, which comprises instructions that make the processor perform:
receiving the media data from the first communication session and of the media data from the second communication session by a unit in the communication network, wherein each of the first communication session and the second communication session is a half-duplex communication session;
combining, based on prescribed and stored combination rules, the media data in the unit in the communication network to form at least one combined media data stream which contains media data of a media data type from the first communication session and the media data of the media data type from the second communication session; and
transmitting the at least one combined media data stream to the communication terminal, so that media data from different communication sessions are sent to the communication terminal, wherein the combination rules are prescribed by a subscriber on the communication terminal and stored in a memory located in a server, and wherein the prescribed and stored combination rules indicate, for each type of media data, the media data from which of the first communication session and the second communication session is to be combined.

19. A communication network unit transmitting media data from a first communication session and media data from a second communication session, wherein a communication terminal participates in the first communication session and in the second communication session, the communication network unit comprising:

a receiving means for receiving media data from the first communication session and media data from the second communication session, wherein each of the first communication session and the second communication session is accomplished according to a half-duplex communication session protocol;

a media data combining means for combining, based on prescribed and stored combination rules, the media data to form at least one combined media data stream which contains media data of a media data type from the first communication session and media data of the media data type from the second communication session; and a transmitter means for transmitting the at least one combined media data stream to the communication terminal, so that media data from different communication sessions are transmitted to the communication terminal, wherein the combination rules are prescribed by a subscriber on the communication terminal and stored in a file of a memory located in a server, and wherein the prescribed and stored combination rules indicate, for each type of media data, the media data from which of the first communication session and the second communication session is to be combined.

* * * * *